United States Patent
Shim

(10) Patent No.: US 9,317,370 B2
(45) Date of Patent: Apr. 19, 2016

(54) SEMICONDUCTOR APPARATUS AND SYSTEM INCLUDING THE SAME

(71) Applicant: SK hynix Inc., Icheon-si Gyeonggi-do (KR)

(72) Inventor: Jong Joo Shim, Icheon-si Gyeonggi-do (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 97 days.

(21) Appl. No.: 14/100,335

(22) Filed: Dec. 9, 2013

(65) Prior Publication Data
US 2015/0067432 A1 Mar. 5, 2015

(30) Foreign Application Priority Data
Aug. 30, 2013 (KR) .................. 10-2013-0103805

(51) Int. Cl.
| G08C 25/02 | (2006.01) |
| H04L 1/18 | (2006.01) |
| G06F 11/14 | (2006.01) |
| G06F 13/40 | (2006.01) |

(52) U.S. Cl.
CPC ........ *G06F 11/1412* (2013.01); *G06F 13/4072* (2013.01)

(58) Field of Classification Search
CPC .................................................. G06F 11/1412
See application file for complete search history.

(56) References Cited

U.S. PATENT DOCUMENTS

2007/0007342 A1* 1/2007 Cleeves et al. ................ 235/435

FOREIGN PATENT DOCUMENTS

| KR | 100710978 B1 | 4/2007 |
| KR | 1020090013213 A | 2/2009 |

* cited by examiner

*Primary Examiner* — Sam Rizk
(74) *Attorney, Agent, or Firm* — William Park & Associates Ltd.

(57) ABSTRACT

A semiconductor device include: a first reception inductor pad through configured to receive data from a first transmission inductor pad; a second reception inductor pad configured to receive a clock from a second transmission inductor pad; and a data recovery unit configured to generate an output data.

14 Claims, 10 Drawing Sheets

FIG.4
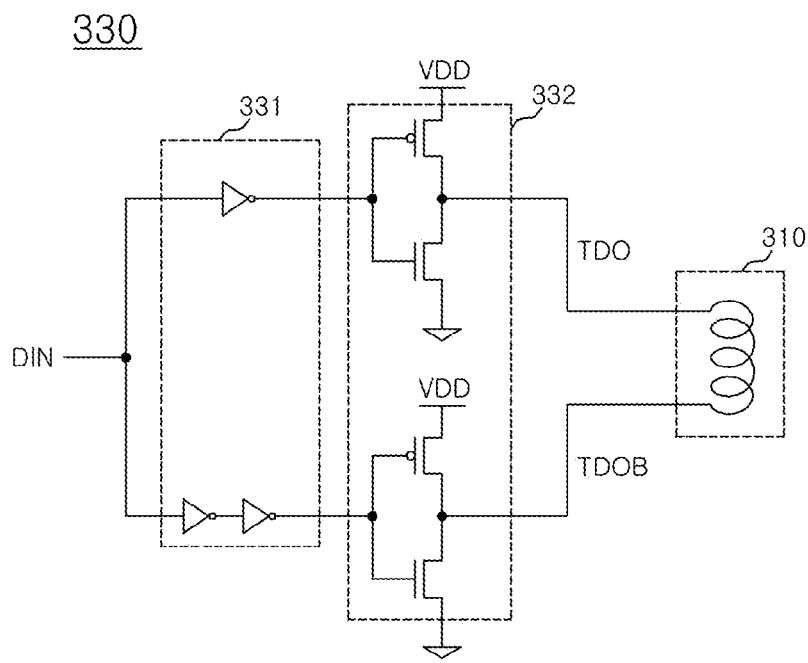
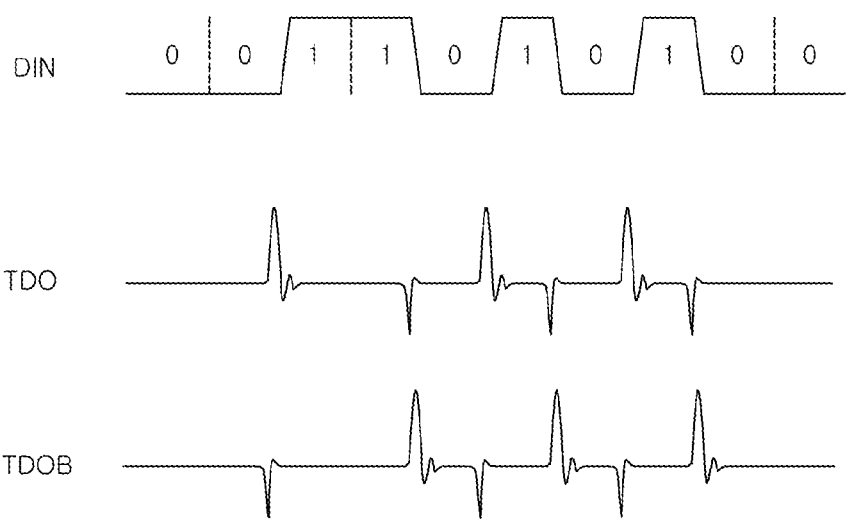

FIG.5
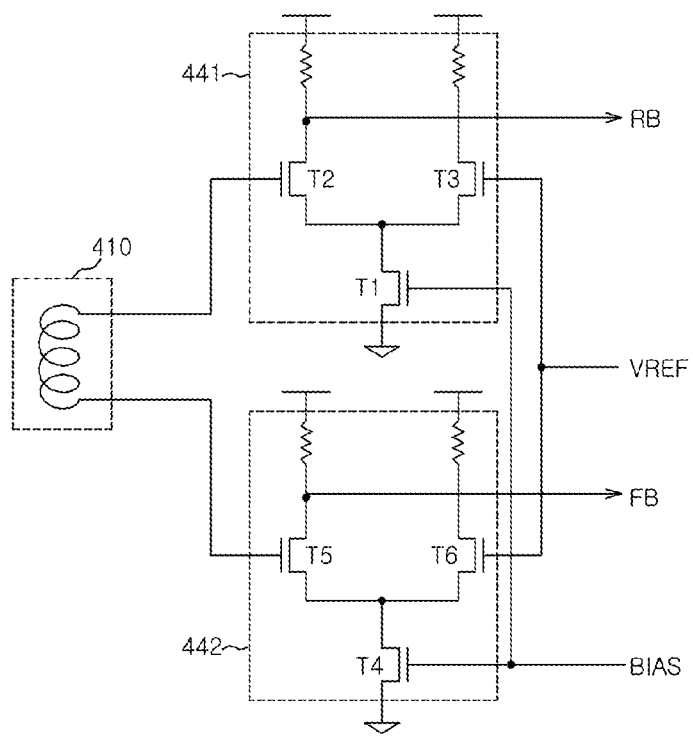
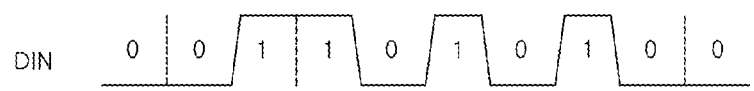
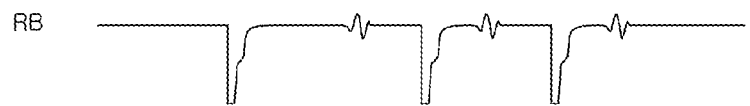

FIG.7
450
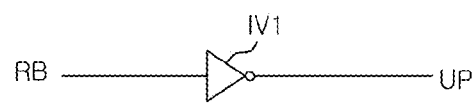
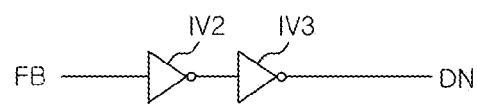

FIG.8
470
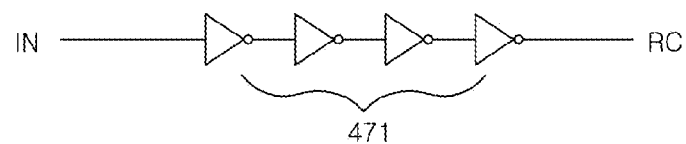
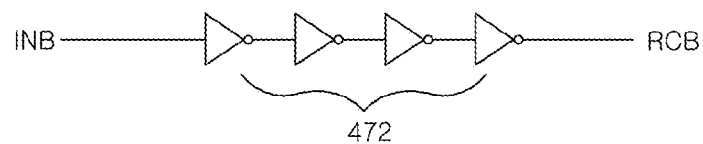

SEMICONDUCTOR APPARATUS AND SYSTEM INCLUDING THE SAME

CROSS-REFERENCE TO RELATED APPLICATION

The present application claims priority under 35 U.S.C. §119(a) to Korean application number 10-2013-0103805, filed on Aug. 30, 2013 in the Korean Intellectual Property Office, which is incorporated by reference herein in its entirety.

BACKGROUND

1. Technical Field

Various embodiments relate to a semiconductor apparatus, and more particularly, to a semiconductor apparatus capable of wireless communication and a system including the same.

2. Description of Related Art

In a semiconductor system, a master device and a slave device communicate with each other through wires. The master device and the slave device have pads and communicate with each other through wires bonded to the pads.

Recently, there has been developed a three-dimensional (3D) semiconductor apparatus in which a plurality of chips are stacked to elevate the degree of integration of the semiconductor apparatus. The stacked chips can communicate with one another through wires or through electrodes such as a TSV (through-silicon via).

FIG. 1 is a structure diagram illustrating a stacked semiconductor device 10 in accordance with a conventional art.

Referring to FIG. 1, the stacked semiconductor device 10 includes a substrate 11, an interposer 12 and a plurality of chips 13 to 15.

A ball grid array 16 is disposed on a first side of the substrate 11. The substrate 11 can be electrically connected with external devices such as a host or a processor through the ball grid array 16.

A C4 bump 17 is disposed on a first side of the interposer 12 that is contacted to a second side of the substrate 11 through the C4 bump 17. The interposer 12 can be electrically connected with the substrate 11 through the C4 bump 17. A micro bump 18 is disposed on a second side of the interposer 12.

A through-silicon via 19 is formed inside each of the plurality of chips 13 to 15 and electrically connects each of the plurality of chips 13 to 15 to one another through the micro bump 18. A bottom chip 13 of the plurality of chips 13 to 15 is electrically connected with the interposer 12 through the micro bump 18 disposed on the interposer 12.

The stacked semiconductor device 10 described above forms electrical connection from the substrate 11 to the uppermost chip 15 of the plurality of chips 13 to 15.

The external devices have only way to access each of the plurality of chips 13 to 15 by transferring signals through the substrate 11 and thus do not have the other way to separately access the plurality of chips 13 to 15, especially after completion of packaging of the stacked semiconductor device 10.

Further, when the plurality of chips 13 to 15 are in a wafer level, it is hard to electrically access the plurality of chips 13 to 15 with a probe during test because the plurality of chips 13 to 15 use the micro bump 18.

SUMMARY

A semiconductor device, in which a master device and a slave device may communicate through wireless communication and a system including the same are described herein.

A semiconductor device in accordance with an embodiment of the invention may include: a first reception inductor pad configured to receive data from a first transmission inductor pad; a second reception inductor pad configured to receive a clock from a second transmission inductor pad; and a data recovery unit configured to generate an output data.

A system in accordance with an embodiment of the invention may include: a master device including: a first transmission inductor pad configured to transmit input data, and a second transmission inductor pad configured to transmit a input clock; and a slave device including: a first reception inductor pad configured to be lined up with the first transmission inductor pad and to receive a data signal outputted from the first transmission inductor pad, and a second reception inductor pad configured to be lined up with the second transmission inductor pad and to receive a clock signal outputted from the second transmission inductor pad, wherein the slave device further comprises a data recovery unit configured to generate an output data, the output data being identical with the input data.

A semiconductor device in accordance with an embodiment of the invention includes: a first transmission inductor pad configured to transmit data to a first reception inductor pad; a second transmission inductor pad configured to transmit a clock signal to a second reception inductor pad; and a data recovery unit configured to combine the data and clock signal to generate an output data.

BRIEF DESCRIPTION OF THE DRAWINGS

Features, aspects, and embodiments are described in conjunction with the attached drawings, in which:

FIG. 4 is a circuit diagram and a signal diagram illustrating a data transmission unit shown in FIG. 3;

FIG. 5 is a circuit diagram and a signal diagram illustrating a data reception unit shown in FIG. 3 in accordance with the invention;

FIG. 7 is a circuit diagram and a signal diagram illustrating a buffer unit shown in FIG. 3;

FIG. 8 is a circuit diagram illustrating a delay unit shown in FIG. 3;

DETAILED DESCRIPTION

Hereinafter, a semiconductor device and a system including the same according to the present disclosure will be described below with reference to the accompanying drawings through embodiments.

Figure 1:
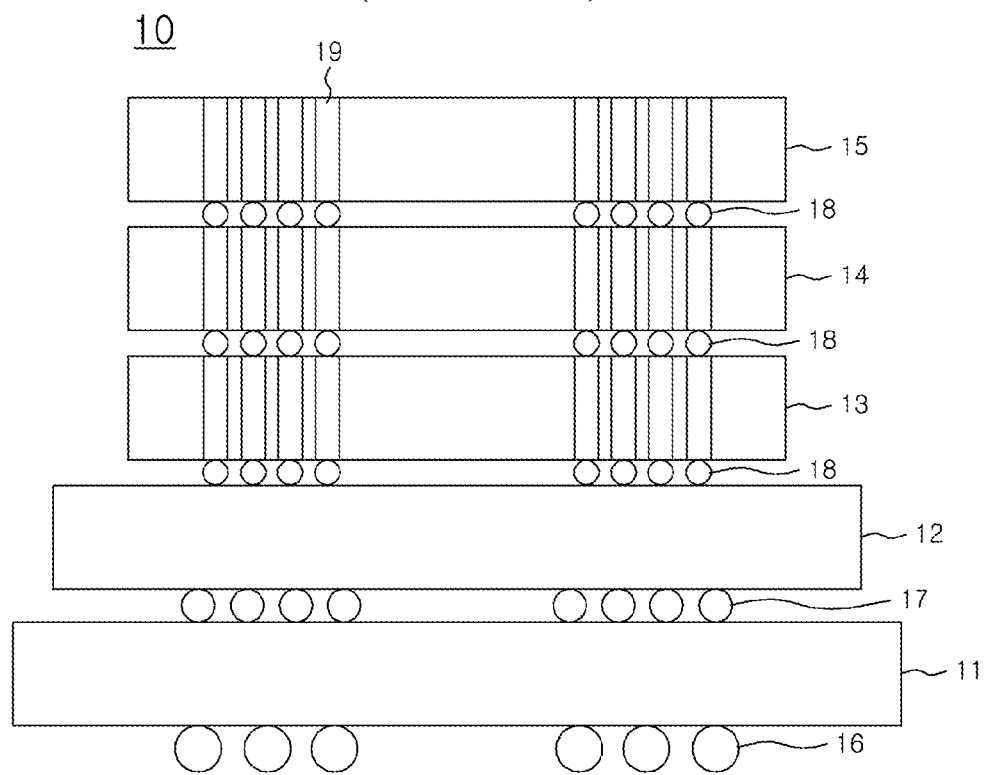
FIG. 1 is a structure diagram illustrating a stacked semiconductor device 10 in accordance with conventional art.
Figure 2:
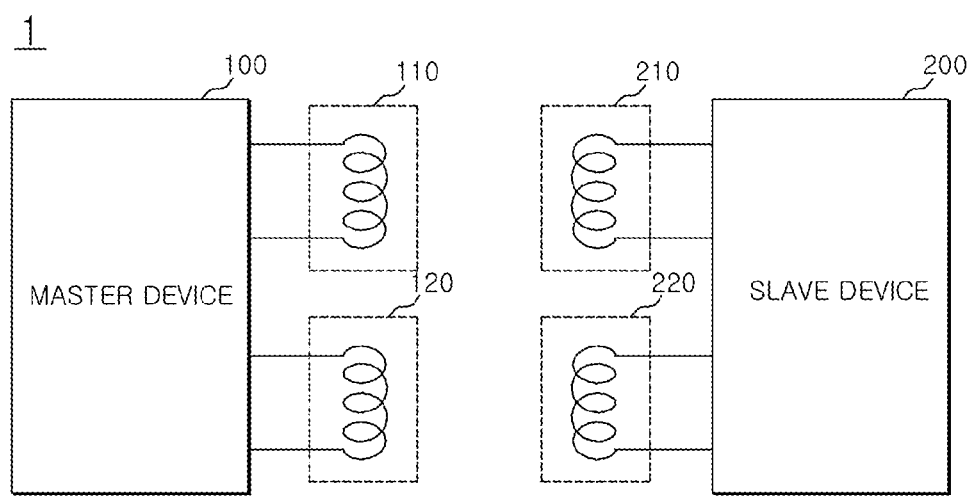
FIG. 2 is a block diagram illustrating a system in accordance with an embodiment of the invention.

Referring to FIG. 2, the system 1 may include a master device 100 and a slave device 200. The master device 100 and the slave device 200 may communicate wirelessly with each other and have inductor pads comprising coils for the wireless communication. For example, inductor pads 110 and 120 of the master device 100 may correspond to, be lined up with and exchange signals with inductor pads 210 and 220 of the slave device 200.

The master device 100 may perform various operations such as receiving and processing data from various external devices and outputting the result of processing to the external devices. The master device 100 may provide various signals for controlling the slave device 200. For example, the master device 100 may provide the slave device 200 with data, address signal, commands, clock signal and so forth. The master device 100 may be a processor, a central processing unit (CPU), a graphics processing unit (GPU), a digital signal processor (DSP), one or more processor cores, a single core processor, a dual core processor, a multiple core processor, a microprocessor, a host processor, a controller, a plurality of processors or controllers, a chip, a microchip, a logic circuit, an integrated circuit (IC), an application-specific IC, or a test circuit.

The slave device 200 may receive the data, the address signal, the commands, the clock signal and so forth from the master device 100 and perform data input and output operations. The slave device 200 may be, for example, a memory device, and include a volatile memory device such as a dynamic random access memory (DRAM) or an nonvolatile memory device such as a flash memory, a phase change random access memory (PCRAM), a resistive random access memory (ReRAM), a ferroelectric random access memory (FeRAM), a magnetic random access memory (MRAM) and a Spin Transfer Torque random access memory (STTRAM).

Correct wireless communications between the master device 100 and the slave device 200 needs to be secured in the system 1 because the system 1 performs the wireless communication operation with the inductor pads 110, 120, 210 and 220. According to an embodiment, the master device 100 may transmit data and a clock signal together to the slave device 200 in order that the slave device 200 may receive the data reliably when the master device 100 sends the data to the slave device 200. Through the inductor pads 210 and 220, the slave device 200 may receive the data and the clock signal transmitted from the inductor pads 110 and 120 of the master device 100. The slave device 200 may correctly recover data, which the master device 100 transmits, based on the received data and the received clock signal. The concepts of the invention may also be applied to the case that the slave device 200 transmits data to the master device 100.

Figure 3:
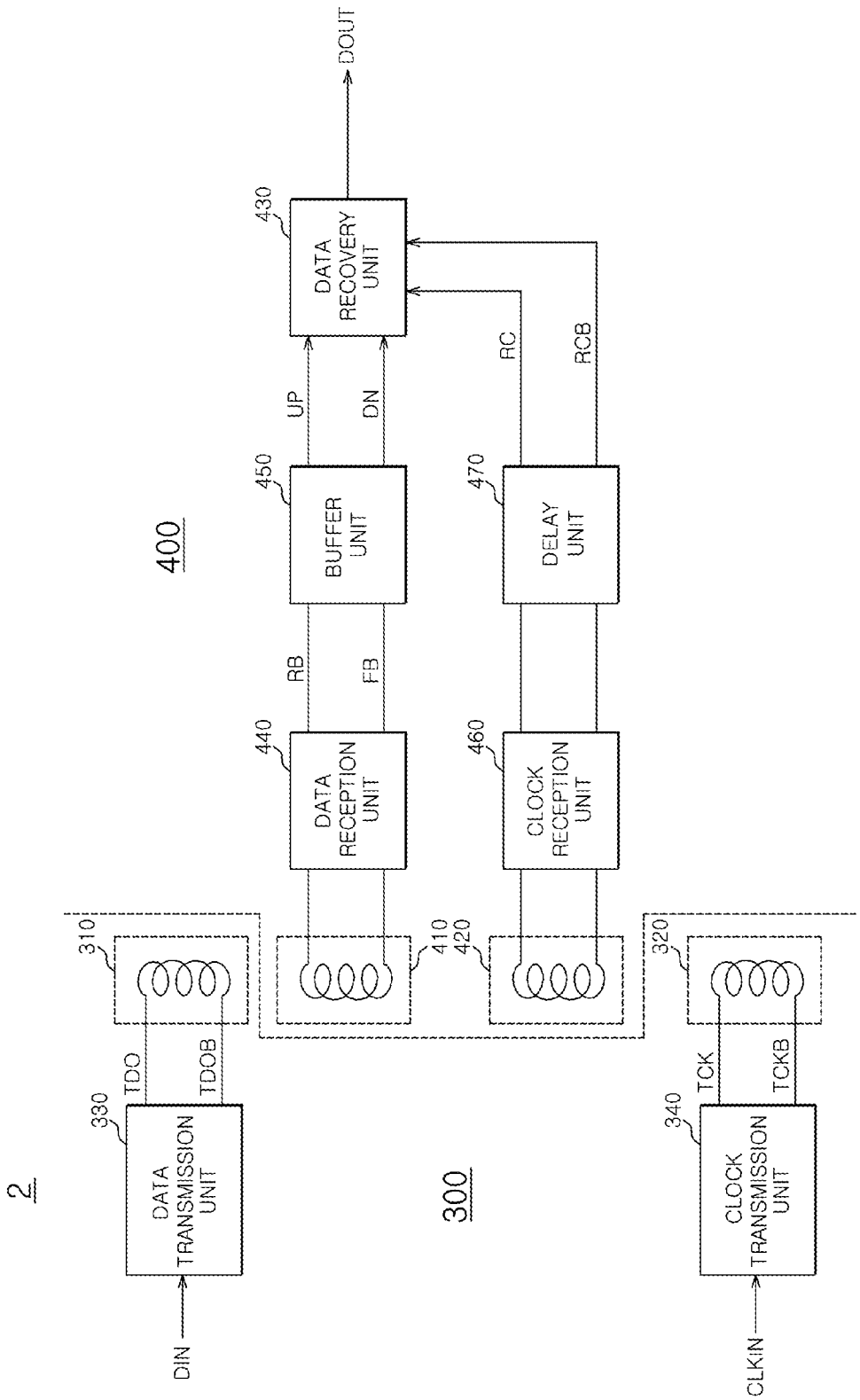
FIG. 3 is a detailed block diagram illustrating a system in accordance with an embodiment of the invention.

FIG. 3 is a detailed block diagram illustrating the system 2 in accordance with an embodiment of the invention.

Referring to FIG. 3, the master device 300 may include the first transmission inductor pad 310 and the second transmission inductor pad 320 and the slave device 400 may include the first reception inductor pad 410, the second reception inductor pad 420 and a data recovery unit 430.

The first transmission inductor pad 310 may transmit input data DIN. The first reception inductor pad 410 may be lined up with the first transmission inductor pad 310 and receive the data transmitted through the first transmission inductor pad 310.

The second transmission inductor pad 320 may transmit a input clock signal CLKIN. The second reception inductor pad 420 may be lined up with the second transmission inductor pad 320 and receive the clock signal transmitted through the second inductor pad 320.

The data recovery unit 430 may combine the received data and clock signal through the first reception inductor pad 410 and the second reception inductor pad 420 to generate output data DOUT.

FIG. 3 illustrates the master device 300 as a transmitter and the slave device 400 as a receiver in accordance with an embodiment of the invention, which may also be applied to the case of the master device 300 as a receiver and the slave device 400 as a transmitter.

The master device 300 may further include a data transmission unit 330 and a clock transmission unit 340.

The data transmission unit 330 may be coupled to the first transmission inductor pad 310, drive the input data DIN and output transmission data TDO and TDOB, which are result of driving the input data DIN, to the first transmission inductor pad 310.

The clock transmission unit 340 may be coupled to the second transmission inductor pad 320, drive the input clock signal CLKIN and output transmission clocks TCK and TCKB, which are result of driving the input clock signal CLKIN, to the second transmission inductor pad 320.

The slave device 400 may further include a data reception unit 440 and a buffer unit 450.

The data reception unit 440 may be coupled to the first reception inductor pad 410 and amplify the data received through the first reception inductor pad 410. The data reception unit 440 may differentially amplify the data received through the first reception inductor pad 410 and generate differential output signals RB and FB.

The buffer unit 450 may be coupled to the data reception unit 440, buffer the differential output signals RB and FB outputted from the data reception unit 440 and generate a data transition signals UP and DN.

The slave device 400 may further include a clock reception unit 460 and a delay unit 470.

The clock reception unit 460 may be coupled to the second reception inductor pad 420 and amplify the clock signal received through the second reception inductor pad 420.

The delay unit 470 may delay output of the clock reception unit 460 and generate delayed clock signals RC and RCB.

The data recovery unit 430 may generate the output data DOUT based on the data transition signals UP and DN from the buffer unit 450 and the delayed clock signals RC and RCB from the delay unit 470.

FIG. 4 is a circuit diagram and a signal diagram illustrating the configurations and operations of the data transmission unit 330 shown in FIG. 3.

Referring to FIG. 4, the data transmission unit 330 may include a pre driver 331 and a main driver 332.

The pre driver 331 may generate differential data through non-inverted drive and inverted drive of the input data DIN. The main driver 332 may drive the differential data outputted from the pre driver 331 to generate and output the transmission data TDO and TDOB to the first transmission inductor pad 410.

Wave forms of the transmission data TDO and TDOB outputted from the main driver 332 may be such as shown in FIG. 4 according to logic value of the input data DIN since the data transmission unit 330 may be coupled to the first transmission inductor pad 310 comprising a coil. The transmission data TDO and TDOB outputted from the main driver 332 may be enabled in the form of a pulse at the time which a logic level of the input data DIN is changed, that is, when the logic level of the input data DIN transitions from logic level "1" to "0" or vice versa.

The clock transmission unit 340 may have the same structure as the data transmission unit 330. The transmission clocks TCK and TCKB outputted from the clock transmission unit 340 may be enabled in the form of a pulse at a rising edge or a falling edge of the input clock CLKIN.

FIG. 5 illustrates configurations and operations of an embodiment of the data reception unit 440 shown in FIG. 3.

Referring to FIG. 5, the data reception unit 440A may receive the signal received through the first reception inductor pad 410. The signal received through the first reception inductor pad 410 may be substantially same as the signals TDO and TDOB outputted from the first transmission inductor pad 310.

The data reception unit 440A may include a first differential amplifier 441 and a second differential amplifier 442.

The first differential amplifier 441 may be enabled when a first transistor T1 is turned on by receiving a bias voltage BIAS. When the first differential amplifier 441 is enabled, the first differential amplifier 441 may compare voltage levels of a reference voltage VREF and the signal received through the first reception inductor pad 410 and generate the first differential output signal RB. The first differential amplifier 441 may receive, through a second transistor T2, the signal received through the first reception inductor pad 410 and, through a third transistor T3, the reference voltage VREF.

The second differential amplifier 442 may be enabled when a fourth transistor T4 is turned on by receiving a bias voltage BIAS. When the second differential amplifier 442 is enabled, the second differential amplifier 442 may compare voltage levels of a reference voltage VREF with the signal received through the first reception inductor pad 410 and generate the second differential output signal FB. The second differential amplifier 442 may receive, through a fifth transistor T5, the signal received through the first reception inductor pad 410 and, through a sixth transistor T6, the reference voltage VREF.

Wave forms of the first differential output signal RB and the second differential output signal FB outputted from the first differential amplifier 441 and the second differential amplifier 442 may be such as shown in FIG. 5 according to logic value of the input data DIN since the first differential amplifier 441 and the second differential amplifier 442 may receive the signal received through the first reception inductor pad 410, which is substantially same as the transmission data TDO and TDOB outputted from the first transmission inductor pad d10 whose wave form is illustrated in FIG. 4. The first differential output signal RB outputted from the first differential amplifier 441 may be enabled in the form of a pulse when the logic level of the input data DIN transitions from logic level "0" to "1". The second differential output signal FB outputted from the second differential amplifier 442 may be enabled in the form of a pulse when the logic level of the input data DIN transitions from logic level "1" to "0".

Figure 6:
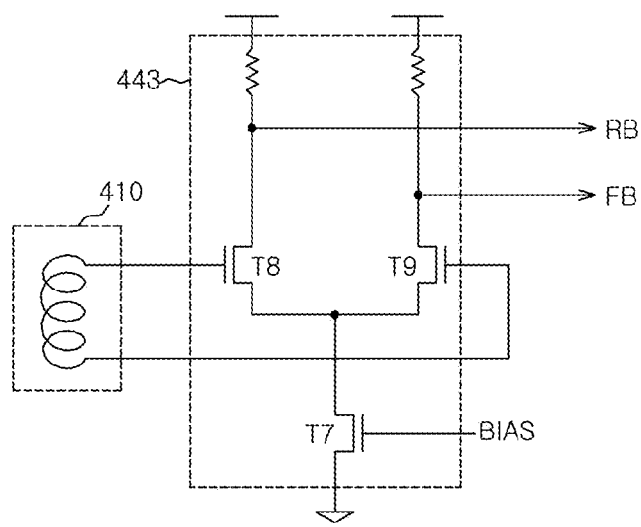
FIG. 6 is a circuit diagram illustrating a data reception unit shown in FIG. 3 in accordance with the invention.

FIG. 6 is illustrates an embodiment of the data reception unit 440 shown in FIG. 3.

Referring to FIG. 6, the data reception unit 440B, unlike the data reception unit 440A illustrated in FIG. 5, may include one differential amplifier 443. The data reception unit 440 illustrated in FIG. 6 may generate the first differential output signal RB and the second differential output signal FB by differentially amplifying the signal received through the first reception inductor pad 410 without the reference voltage VREF.

The differential amplifier 443 may be enabled when a seventh transistor T7 is turned on by receiving a bias voltage BIAS. The differential amplifier 443 may generate the first differential output signal RB and the second differential output signal FB with an eighth transistor T8 and a ninth transistor T9 respectively coupled to each terminal of the first reception inductor pad 410.

The first differential output signal RB and the second differential output signal FB outputted from the data reception unit 440B may have the same wave form as those output from the data reception unit 440A of FIG. 5.

The clock reception unit 460 shown in FIG. 3 may have the same configuration as the data reception units 440A and 440B shown in FIG. 5 and FIG. 6.

FIG. 7 is a circuit diagram and a signal diagram illustrating the buffer unit 450 shown in FIG. 3.

Referring to FIG. 7, the buffer unit 450 may include a first to a third inverters IV1 to IV3.

The first inverter IV1 may invert the first differential output signal RB. The second inverter IV2 may invert the second differential output signal FB. The third inverter IV3 may invert the output of the second inverter IV2.

The data transition signal may include an up signal UP and a down signal DN. The up signal UP and the down signal DN may be generated from the first differential output signal RB and the second differential output signal FB, respectively.

The first to the third inverters IV1 to IV3 may buffer the first differential output signal RB and the second differential output signal FB, which are transmitted through the first transmission inductor pad 310 and the first reception inductor pad 410 and include noise, and generate the up signal UP and the down signal DN including reduced noise.

The up signal UP outputted from the first inverter IV1 may be enabled with a high level in the form of a pulse when the logic level of the input data DIN transitions from logic level "0" to "1" since the up signal UP is generated by inverting the first differential output signal RB. The down signal DN outputted from the third inverter IV3 may be enabled with a low level in the form of a pulse when the logic level of the input data DIN transitions from logic level "1" to "0".

FIG. 8 is a circuit diagram illustrating the delay unit 470 shown in FIG. 3.

Referring to FIG. 8, the delay unit 470 may include a first and a second delay chains 471 and 472.

The delay unit 470 may delay the signal transmitted through the second reception inductor pad 420 and the clock reception unit 460 and generate the first delayed clock signal RC and the second delayed clock signal RCB. The delay unit 470 may delay the signal outputted from the clock reception unit 460 by predetermined amount of time to align generation timings of the delayed clock signal RC and the data transition signal UP and DN.

The first and the second delay chains 471 and 472 may have fixed amount of delay time or variable amount of delay time controlled by a control signal.

The first delay chain 471 may delay a first differential output signal IN, which is outputted from the clock reception unit 460 and enabled at the rising edge of the input clock CLKIN, and generate the first delayed clock signal RC.

The second delay chain 472 may delay a second differential output signal INB, which is outputted from the clock reception unit 460 and enabled at the falling edge of the input clock CLKIN, and generate the second delayed clock signal RCB.

The first delayed clock signal RC may be enabled in the form of a pulse at the rising edge of the input clock CLKIN. The second delayed clock signal RCB may be enabled in the form of a pulse at the falling edge of the input clock CLKIN.

Figure 9:
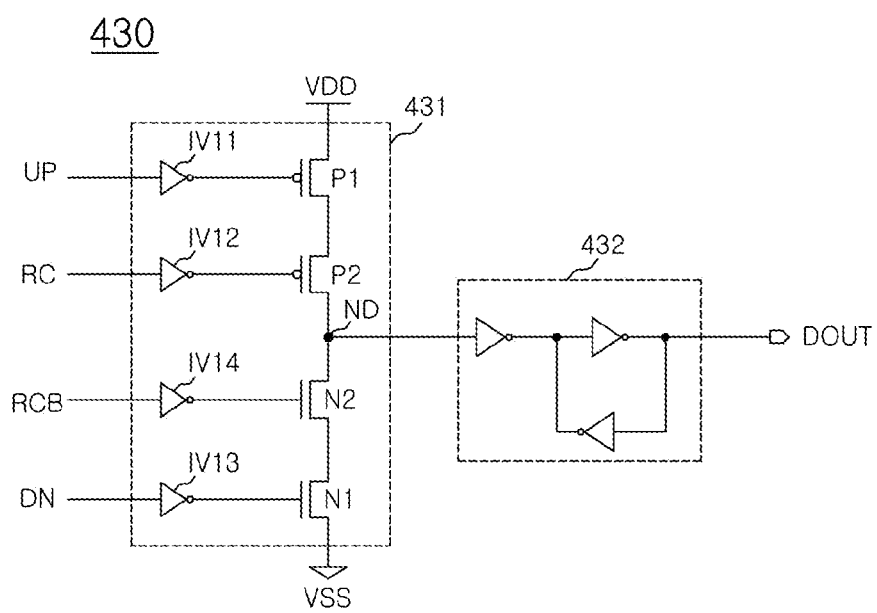
FIG. 9 is a circuit diagram illustrating a data recovery unit shown in FIG. 3.

FIG. 9 is a circuit diagram illustrating the data recovery unit 430 shown in FIG. 3.

Referring to FIG. 9, the data recovery unit 430 may generate the output data DOUT based on the data transition signal UP and DN and the delayed clock signal RC and RCB. The data recovery unit 430 may include a trigger unit 431 and a latch unit 432. The up signal UP may be enabled when a level of the received data changes to a first level and the down signal DN may be enabled when the level of the received data changes to a second level.

The trigger unit 431 may output a voltage of a first level in response to an enablement of the up signal UP and the first delayed clock signal RC and a voltage of a second level in response to an enablement of the down signal DN and a disablement of the second delayed clock signal RCB. The first voltage level may be the logic level "1" and the second voltage level may be the logic level "0". In FIG. 9, the first voltage level may be the level of a power source voltage VDD and the second voltage level may be the level of a ground voltage VSS.

The latch unit 432 may generate the output data DOUT by latching the output of the trigger 431.

The trigger unit may include a first to a fourth inverters IV11 to IV14, a first PMOS transistor P1, a second PMOS transistor P2, a first NMOS transistor N1 and a second NMOS transistor N2.

The first inverter IV11 may invert the up signal UP, the second inverter IV12 may invert the first delayed clock signal RC, the third inverter IV13 may invert the down signal DN and the fourth inverter IV14 may invert the second delayed clock signal RCB.

The first and the second PMOS transistors P1 and P2 may be coupled in series between the power source voltage VDD and an output node ND and respectively receive at each gate the outputs of the first and the second inverters IV11 and IV12.

The first and the second NMOS transistors N1 and N2 may be coupled in series between the output node ND and the ground voltage VSS and respectively receive at each gate the outputs of the third and the fourth inverters IV13 and IV14.

The first and the second PMOS transistors P1 and P2 may be turned on in response to an enablement of the up signal UP and the first delayed clock signal RC and provide the power source voltage VDD to the output node ND. The first and the second NMOS transistors N1 and N2 may be turned on in response to a disablement of the down signal DN and the second delayed clock signal RCB and provide the ground voltage VSS to the output node ND.

The latch unit 432 may generate the output data DOUT to non-inverted latch the output signal from the output node ND.

Figure 10:
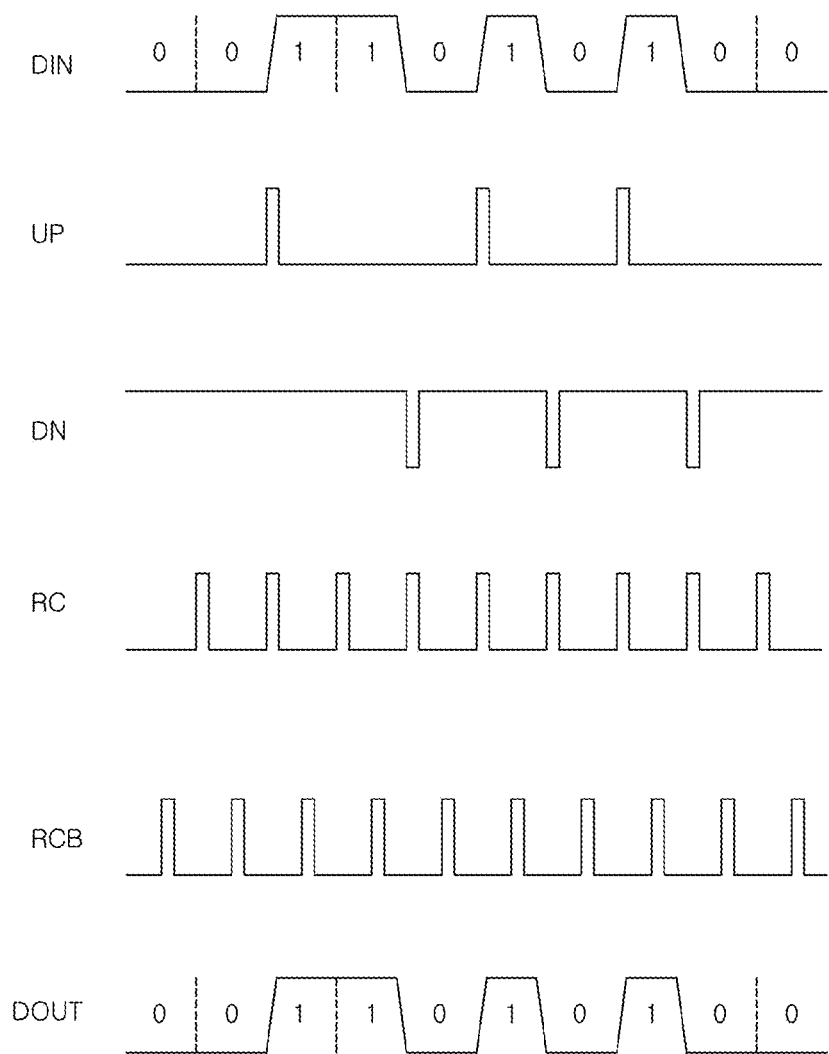
FIG. 10 a signal timing diagram illustrating a system in accordance with the invention.

FIG. 10 a signal timing diagram illustrating operations of a system in accordance with the invention.

With reference to FIGS. 3 to 10, the operations of the system 1 will be described.

When the master device 300 send data to the slave device 400, the data transmission unit 330 disposed in the master device 300 may output the transmission data TDO and TDOB based on the input data DIN to the first transmission inductor pad 310. The clock transmission unit 340 may output the transmission clock signal TCK and TCKB based on the input clock CLKIN to the second transmission inductor pad 320.

The first transmission inductor pad 310, which is lined up with the first reception inductor pad 410, may generate the induced electromotive force and the data reception unit 440 may receive through the first reception inductor pad 410 the signal transmitted through the first transmission inductor pad 310.

Likewise, the second transmission inductor pad 320, which is lined up with the second reception inductor pad 420, may generate the induced electromotive force and the clock reception unit 460 may receive through the second reception inductor pad 420 the signal transmitted through the second transmission inductor pad 320.

The buffer unit 450 may generate the up signal UP and the down signal DN based on the first differential output signal RB and the second differential output signal FB outputted from the data reception unit 440. The up signal UP may be enabled with a high level when the logic level of the input data DIN transitions from the logic level "0" to "1". The down signal DN may be enabled with a low level when the logic level of the input data DIN transitions from the logic level "1" to "0".

The delay unit 470 may generate the first delayed clock signal RC and the second delayed clock signal RCB based on the outputted from the clock reception unit 460. The first delayed clock signal RC may be enabled with a high level at the rising edge of the input clock CLKIN. The second delayed clock signal RCB may be enabled with a high level at the falling edge of the input clock CLKIN.

The trigger unit 431 of the data recovery unit 430 may output the voltage of the first level in response to the enablement of the up signal UP and the first delayed clock signal RC. The latch unit 432 may latch the first voltage level. Thus the voltage level of the output data DOUT may be changed to the first voltage level, and the output data DOUT is maintained at the first voltage level.

The trigger unit 431 of the data recovery unit 430 may output the voltage of the second level in response to the enablement of the down signal DN and the disablement of the second delayed clock signal RCB. The latch unit 432 may latch the second voltage level. Thus the voltage level of the output data DOUT may be changed to the second voltage level.

The output data DOUT, which is generated by the data recovery unit 430 based on the up signal UP, the down signal DN, the first delayed clock signal RC and the second delayed clock signal RCB, may be substantially the same as the input data DIN.

While certain embodiments have been described above, it will be understood to those skilled in the art that these embodiments have been described for illustrative purposes. Accordingly, the semiconductor device and the system including the same described herein should not be limited to the described embodiments. Rather, the semiconductor device and the system including the same described herein should be understood in light of the following claims when taken in conjunction with the above description and accompanying drawings.

What is claimed is:
1. A system comprising:
   a master device including:
   a first transmission inductor pad configured to transmit input data, and
   a second transmission inductor pad configured to transmit a input clock, wherein the master device transmits the input data and the input clock to a slave device through the first and second transmission inductor pads, respectively; and
   the slave device including:
   a first reception inductor pad configured to be lined up with the first transmission inductor pad and to receive a data signal from the first transmission inductor pad, and
   a second reception inductor pad configured to be lined up with the second transmission inductor pad and to receive a clock signal from the second transmission inductor pad,
   wherein the slave device further comprises a data recovery unit configured to generate an output data, the output data being identical with the input data.

2. The system of claim 1, the master device further includes:
   a data transmission unit configured to drive and output the input data to the first transmission inductor pad; and
   a clock transmission unit configured to drive and output the input clock to the second transmission inductor pad.

3. The system of claim 1, the slave device further includes:
   a data reception unit configured to amplify the received signal through the first reception inductor pad; and
   a buffer unit configured to buffer an output of the data reception unit to generate a data transition signal.

4. The system of claim 3, wherein the data transition signal includes an up signal and a down signal, and
   wherein the up signal is enabled when a level of the received data signal changes to a first level and the down signal is enabled when the level of the received data signal changes to a second level.

5. The system of claim 3, the slave device further includes:
   a clock reception unit configured to amplify the received signal through the second reception inductor pad; and
   a delay unit configured to delay an output of the clock reception unit to generate a delayed clock signal.

6. The system of claim 5, wherein the delay unit delays the output of the clock reception unit by predetermined amount of time to align generation timings of the delayed clock signal and the data transition signal.

7. The system of claim 3, wherein the data transition signal includes a up signal and a down signal, and
   wherein the data recovery unit includes:
   a trigger unit configured to output a voltage of a first level in response to enablement of the up signal and the delayed clock signal and to output a voltage of a second level in response to enablement of the down signal and disablement of the delayed clock signal; and
   a latch unit to latch an output of the trigger unit to generate the output data.

8. A system comprising a master device and a slave device, wherein the master device includes:
   a first transmission inductor pad configured to transmit data to a first reception inductor pad of the slave device; and
   a second transmission inductor pad configured to transmit a clock signal to a second reception inductor pad of the slave device,
   wherein the slave device includes a data recovery unit configured to combine the data and clock signal to generate an output data.

9. The system of claim 8, further comprising:
   a data transmission unit configured to drive input data and output transmission data to the first transmission inductor pad.

10. The system of claim 8, further comprising:
    a clock transmission unit configured to drive an input clock and output transmission clocks to the second transmission inductor pad.

11. The system of claim 8, wherein the data recovery unit is configured to generate the output data in response to one or more data transition signals from a buffer unit.

12. The system of claim 9, further comprising:
    a main driver configured to drive differential data to generate and output the transmission data to the first transmission inductor pad.

13. The system of claim 8, further comprising:
    a first differential amplifier configured to compare voltage levels of a reference voltage and generate a first differential output signal; and
    a second differential amplifier configured to compare the voltage levels of the reference voltage and generate a second differential output signal.

14. The system of claim 13, where one or more data transition signals are generated from the first differential output signal and the second differential output signal.

* * * * *